United States Patent
Tonouchi et al.

(10) Patent No.: US 11,650,175 B2
(45) Date of Patent: May 16, 2023

(54) DISPERSION LIQUID, PREPARATION METHOD THEREOF, GAS SENSOR, AND METHOD FOR MANUFACTURING SAME

(71) Applicant: NEC CORPORATION, Tokyo (JP)

(72) Inventors: Noriyuki Tonouchi, Tokyo (JP); Ryota Yuge, Tokyo (JP)

(73) Assignee: NEC CORPORATION, Tokyo (JP)

( * ) Notice: Subject to any disclaimer, the term of this patent is extended or adjusted under 35 U.S.C. 154(b) by 770 days.

(21) Appl. No.: 16/484,700

(22) PCT Filed: Feb. 13, 2017

(86) PCT No.: PCT/JP2017/005129
§ 371 (c)(1),
(2) Date: Aug. 8, 2019

(87) PCT Pub. No.: WO2018/146810
PCT Pub. Date: Aug. 16, 2018

(65) Prior Publication Data
US 2020/0003716 A1  Jan. 2, 2020

(51) Int. Cl.
*G01N 27/12* (2006.01)
*C01B 32/18* (2017.01)
*B01J 20/20* (2006.01)
*B01J 20/28* (2006.01)
*B01J 20/32* (2006.01)

(52) U.S. Cl.
CPC .......... *G01N 27/125* (2013.01); *B01J 20/205* (2013.01); *B01J 20/28023* (2013.01); *B01J 20/324* (2013.01); *C01B 32/18* (2017.08)

(58) Field of Classification Search
CPC .... B01J 20/205; B01J 20/28023; C01B 32/18
See application file for complete search history.

(56) References Cited

U.S. PATENT DOCUMENTS

2012/0202060 A1\* 8/2012 Yuge ....................... H01J 1/304
423/447.2

FOREIGN PATENT DOCUMENTS

| JP | 2006-329802 A | 12/2006 |
| JP | 2008-185495 A | 8/2008 |
| JP | 2010-038692 A | 2/2010 |
| WO | 01/44796 A1 | 6/2001 |
| WO | 2016/147909 A1 | 9/2016 |
| WO | 2016/208170 A1 | 12/2016 |

OTHER PUBLICATIONS

Machine translation JP2006-329802 (Year: 2006).\*
Suehiro et al. (Application of dielectrophoresis to fabrication of carbon nanohorn gas sensor, Journal of Electrostatics 64 (2006) 408-415). (Year: 2006).\*
Ryota Yuge et al., "Preparation and Characterization of Newly Discovered Fibrous Aggregates of Single-Walled Carbon Nanohorns", Advanced Materials, May 25, 2016, pp. 7174-7177, vol. 28, No. 33.
International Search Report for PCT/JP2017/005129 dated Mar. 7, 2017 [PCT/ISA/210].

\* cited by examiner

*Primary Examiner* — Alexandre F Ferre
(74) *Attorney, Agent, or Firm* — Carl J Pellegrini

(57) ABSTRACT

A dispersion liquid of the present invention includes: a carbon nanohorn aggregate obtained by aggregating a plurality of single-walled carbon nanohorns in a fibrous form; and a solvent.

3 Claims, 6 Drawing Sheets

DISPERSION LIQUID, PREPARATION METHOD THEREOF, GAS SENSOR, AND METHOD FOR MANUFACTURING SAME

CROSS REFERENCE TO RELATED APPLICATIONS

This application is a National Stage of International Application No. PCT/JP2017/005129 filed Feb. 13, 2017.

TECHNICAL FIELD

The present invention relates to a dispersion liquid, a preparation method thereof, a gas sensor, and a method for manufacturing the same.

BACKGROUND ART

As one of gas sensors using carbon nanotubes that are a fibrous carbon material, for example, a molecular sensor including nanotubes disposed between two catalyst islands above a substrate is known (for example, refer to Patent Document 1). Furthermore, as one of sensors using carbon nanotubes, for example, a gas sensor using a single-walled carbon nanotube aggregate obtained by firing a hydroxypropyl cellulose thin film containing single-walled carbon nanotubes as single-walled carbon nanotubes is known (for example, refer to Patent Document 2). In addition, as one of gas sensors using carbon nanotubes, for example, a gas detection element which includes a detection electrode provided above an insulating substrate and a sensitive layer in contact with the detection electrode and including carbon nanotubes as a main component is known (for example, refer to Patent Document 3).

PRIOR ART DOCUMENTS

Patent Documents

[Patent Document 1] PCT International Publication No. WO2001/044796
[Patent Document 2] Japanese Unexamined Patent Application, First Publication No. 2008-185495
[Patent Document 3] Japanese Unexamined Patent Application, First Publication No. 2010-38692

SUMMARY OF THE INVENTION

Problem to be Solved by the Invention

Carbon nanotubes are usually present as aggregates. Since the atoms in surfaces of carbon nanotubes are coordinately unsaturated, adjacent atoms coordinate with each other and aggregate by acquiring stabilization energy using intermolecular forces. When a dispersion liquid containing carbon nanotubes aggregated in this way is prepared, the carbon nanotubes do not disperse uniformly in a solution. A thin film formed by applying such a non-uniform dispersion liquid above a substrate has a non-uniform thickness as a whole. Furthermore, this thin film has an uneven content of carbon nanotubes as a whole. As described above, a thin film having a non-uniform thickness easily peels off from a substrate due to an external force and is not able to be stably present above the substrate. Therefore, there is a problem that it is difficult to obtain a gas sensor having a detection portion made of a uniform thin film, when forming a coating film using a dispersion liquid containing carbon nanotubes if the thin film has an uneven thickness.

The present invention was made in view of the above circumstances, and an object of the present invention is to provide a dispersion liquid, a preparation method thereof, a gas sensor obtained using this dispersion liquid, and a method for manufacturing the same capable of forming a thin film having a uniform thickness and content of a fibrous carbon material.

Means for Solving the Problem

A dispersion liquid of the present invention includes: a carbon nanohorn aggregate in which a plurality of single-walled carbon nanohorns are aggregated in a fibrous form; and a solvent.

Effect of the Invention

According to the present invention, it is possible to provide a gas sensor which includes a thin film in which a thickness and a content of a fibrous carbon material are uniform.

EMBODIMENTS FOR CARRYING OUT THE INVENTION

Figure 1:
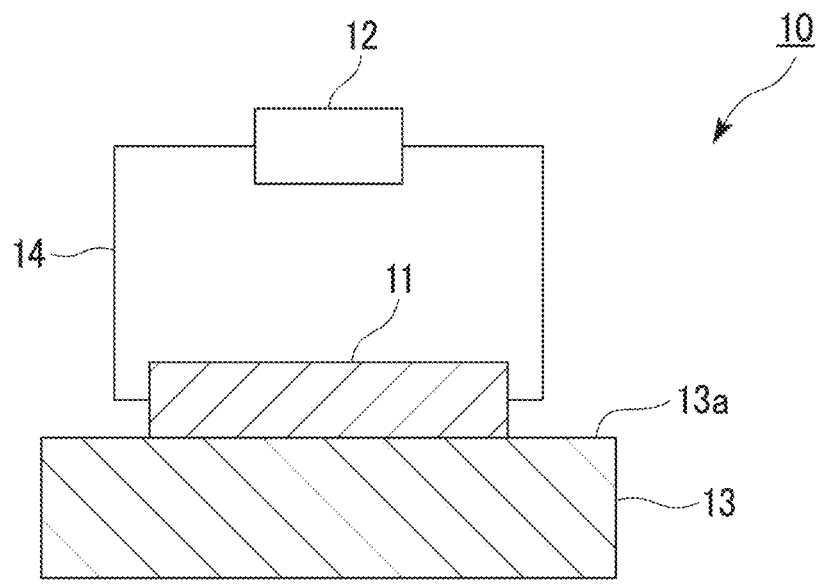
FIG. 1 is a schematic diagram showing a first exemplary embodiment of a gas sensor.

An embodiment of a dispersion liquid, a preparation method thereof, a gas sensor, and a method for manufacturing the same of the present invention will be described.
Note that an embodiment is specifically described for better understanding of the spirit of the invention and does not limit the present invention unless otherwise stated.
[Dispersion Liquid]
A dispersion liquid of an embodiment includes a carbon nanohorn aggregate (hereinafter referred to as a "fibrous nanohorn aggregate") in which a plurality of single-walled carbon nanohorns are connected in a fibrous form, and a solvent.

In the dispersion liquid in the embodiment, the fibrous carbon nanohorn aggregate is a fibrous carbon material. The fibrous carbon nanohorn aggregate in the embodiment has a structure in which carbon nanohorn aggregates such as a seed type, a bud type, a dahlia type, a petal-dahlia type, and a petal type (a graphene sheet structure) are further connected one-dimensionally. Single-walled carbon nanohorns have a structure in which the single-walled carbon nanohorns are radially aggregated and connected in a fibrous form. That is to say, the fibrous carbon nanohorn aggregate in the embodiment includes one or more types of these carbon nanohorn aggregate in a fibrous structure. Furthermore, the fibrous carbon nanohorn aggregate in the embodiment is prepared by evaporating a target using a catalytic metal. For this reason, a catalytic metal is present inside a fibrous carbon nanohorn aggregate or a spherical carbon nanohorn aggregate. When a fibrous carbon nanohorn aggregate is manufactured using a preparation method which will be described later, a spherical carbon nanohorn aggregate is simultaneously generated. Since the fibrous carbon nanohorn aggregate manufactured using the preparation method which will be described later includes the fibrous carbon nanohorn aggregate and the spherical carbon nanohorn aggregate, a woven carbon nanohorn aggregate has a structure in which the woven carbon nanohorn aggregate is less likely to aggregate. Furthermore, the fibrous carbon nanohorn aggregate has high dispersibility in a solution like the spherical carbon nanohorn aggregate. It should be noted that the fibrous carbon nanohorn aggregate and the spherical carbon nanohorn aggregate can be separated using centrifugal separation, a difference between sedimentation velocities after dispersion in a solvent, gel permeation chromatography, and the like. In order to maintain the dispersibility of the fibrous carbon nanohorn aggregate, it is desirable to use the fibrous carbon nanohorn aggregate and the spherical carbon nanohorn aggregate as they are without separation. The fibrous carbon nanohorn aggregate in the embodiment is not limited to the above-described structure as long as the single-walled carbon nanohorns are aggregated in a fibrous form.

The single-walled carbon nanohorns have a diameter of approximately 1 nm to 5 nm and a length of 30 nm to 100 nm.

The fibrous carbon nanohorn aggregate has a diameter of about 30 nm to 200 nm and a length of about 1 μm to 100 μm.

The spherical carbon nanohorn aggregate has a diameter of about 30 nm to 200 nm and a substantially uniform size.

The spherical carbon nanohorn aggregate is formed of seed type, bud type, dahlia type, petal-dahlia type, and petal type carbon nanohorn aggregates independently or in a combination thereof. The seed type carbon nanohorn aggregate has a shape with few or no angular projections on a spherical surface. The bud type carbon nanohorn aggregate has a shape in which some angular projections are present on a spherical surface. The dahlia type carbon nanohorn aggregate has a shape in which a large number of angular projections are present on a spherical surface. The petal type carbon nanohorn aggregate has a shape in which petal-like projections are present on a spherical surface. A petal structure is a structure in which a width is 50 nm to 200 nm, a thickness is 0.34 nm to 10 nm, and 2 to 30 graphene sheets overlap. The petal-dahlia type carbon nanohorn aggregate has an intermediate structure between the dahlia type carbon nanohorn aggregate and the petal type carbon nanohorn aggregate. The spherical carbon nanohorn aggregate is formed in a mixed state separately from the fibrous carbon nanohorn aggregate. In the formed spherical carbon nanohorn aggregate, the shape and the particle size thereof change in accordance with the type and the flow rate of a gas.

Here, a preparation method of the fibrous carbon nanohorn aggregate will be described.

In order to manufacture a fibrous carbon nanohorn aggregate, a carbon containing a catalyst is used as a target (hereinafter referred to as a "catalyst-containing carbon target"). The catalyst-containing carbon target is placed in a vessel and the catalyst-containing carbon target is rotated. The catalyst-containing carbon target is evaporated by heating the catalyst-containing carbon target using laser ablation under a nitrogen atmosphere, under an inert atmosphere, or under a mixed atmosphere while the catalyst-containing carbon target is being rotated. In the process of cooling the evaporated carbon and catalyst, a fibrous carbon nanohorn aggregate is obtained in a state in which the fibrous carbon nanohorn aggregate is mixed with a spherical carbon nanohorn aggregate. It should be noted that, as a preparation method of a fibrous carbon nanohorn aggregate, an arc discharge method and a resistance heating method can be used other than the above-described laser ablation method. However, the laser ablation method is more desirable in view of being able to continuously manufacture in atmospheric pressure at room temperature.

A laser ablation (LA) method applied in the embodiment is a method in which, when a target is irradiated with a laser in a pulse form or continuously and an irradiation intensity is a threshold value or more, the target converts energy, and as a result, a plume is generated, a product is deposited above a substrate provided downstream of the target or is generated in a space in an apparatus and is recovered in a recovery chamber.

For laser ablation, a $CO_2$ laser, a YAG laser, an excimer laser, a semiconductor laser, and the like can be used. Among these, a $CO_2$ laser which readily allows a high output to be achieved is most desirable. The $CO_2$ laser can have an output of 1 $kW/cm^2$ to 1000 $kW/cm^2$ and can perform continuous irradiation and pulse irradiation. In order to form a carbon nanohorn aggregate, continuous irradiation is desirable. In laser ablation, a laser beam is focused using a ZnSe lens or the like and a target is irradiated with the laser beam.

Also, carbon nanohorn aggregates can be synthesized continuously by rotating a target. Although a rotational speed of the target can be set arbitrarily, it is particularly desirable to be 0.1 rpm to 6 rpm. If the rotational speed of the target is 0.1 rpm or more, graphitization of a carbon nanohorn aggregate can be minimized. On the other hand, if the rotational speed of the target is 6 rpm or less, an increase in amorphous carbon can be minimized.

At this time, a laser output is preferably 15 $kW/cm^2$ or more and most preferably 30 $kW/cm^2$ to 300 $kW/cm^2$. If the laser output is 15 $kW/cm^2$ or more, the catalyst-containing carbon target is appropriately evaporated and easily synthesized. On the other hand, if the laser output is 300 $kW/cm^2$ or less, an increase in amorphous carbon can be minimized.

Although a pressure used in a vessel (a chamber) can be 13332.2 hPa (10000 Torr) or less, when the pressure is closer to a vacuum, carbon nanotubes are easily generated but a carbon nanohorn aggregate cannot be obtained. It is desirable to operate in a range of 666.61 hPa (500 Torr) to 1266.56 hPa (950 Torr) and it is more desirable to operate in the vicinity of a normal pressure (1013 hPa (1 atm≈760 Torr) for the purpose of mass production and cost reduction. Furthermore, an irradiation area can be controlled using a laser output and a degree of focusing through a lens and 0.005 cm² to 1 cm² can be used.

It is desirable that the catalyst-containing carbon target have low thermal conductivity and be soft. The thermal conductivity is preferably 80 W/(m/k) or less, and more preferably 30 W/(m/k). It is desirable that the hardness be 40 (HDS) or more and 80 or less. When the catalyst-containing carbon target having high thermal conductivity is used, it is desirable to increase a laser output. An amount of generation of the fibrous carbon nanohorn aggregate changes in accordance with the balance between the thermal conductivity and the hardness of the catalyst-containing carbon target, and the laser output.

As a catalyst, Fe, Ni, and Co may be independently used or a combination thereof can be used. The concentration of a catalyst can be appropriately selected, but is preferably 0.1% by mass to 10% by mass, and more preferably 0.5% by mass to 5% by mass with respect to carbon. When the concentration of the catalyst is 0.1% by mass or more, the formation of a fibrous carbon nanohorn aggregate is ensured. Furthermore, when the concentration of the catalyst is 10% by mass or less, an increase in target cost can be minimized.

Although any temperature can be used for the inside of the vessel, it is preferably 0° C. to 100° C., and more preferably room temperature, which is also appropriate for mass production and cost reduction.

Nitrogen gas, an inert gas, or the like is introduced independently or in a combination thereof into the vessel to make the above-described atmosphere. These gases flow into a reaction vessel and substances to be produced can be recovered using this gas flow. Furthermore, a closed atmosphere may be provided using the introduced gas. A atmosphere gas flow rate may be any amount, but is preferably in a range of 0.5 L/min to 100 L/min. In the process of evaporation of a target, a gas flow rate is controlled such that it is constant. The gas flow rate can be controlled such that it is constant by matching a supply gas flow rate with an exhaust gas flow rate. In the case of performing control near normal pressure, the control can be performed by extruding and exhausting a gas in the vessel using a supply gas.

In the fibrous carbon nanohorn aggregate and the spherical carbon nanohorn aggregate obtained as described above, a part of this carbon skeleton may be substituted with a catalytic metal element, nitrogen atoms, or the like.

An oxidation treatment can be performed when fine holes (opening holes) open in the spherical carbon nanohorn aggregate and the fibrous carbon nanohorn aggregate. By performing oxidation treatment, defect portions such as five-membered rings and seven-membered rings are oxidized. As a result, a portion having five-membered rings or seven-membered rings such as a side surface and a distal end portion is opened. By performing this oxidation treatment, a surface functional group including oxygen is formed in an opening hole portion. Furthermore, a gas phase process and a liquid phase process can be used for the oxidation treatment. In the case of a gas phase process, air, oxygen, and carbon dioxide can be used as an atmosphere gas and air is appropriate in view of cost. Furthermore, a temperature can be in a range of 300° C. to 650° C., and more appropriately 400° C. to 550° C. When the temperature is 300° C. or higher, there is no concern concerning holes which cannot be opened due to almost no burning carbon. Furthermore, when the temperature is 650° C. or lower, combustion of the entire carbon nanohorn aggregates can be minimized. In the case of a liquid phase process, nitric acid, sulfuric acid, hydrogen peroxide, and the like can be used. In the case of nitric acid, the nitric acid can be used in a temperature range of room temperature to 120° C. When the temperature is 120° C. or lower, an oxidizing power is not too high and oxidization is not performed more than necessary. In the case of hydrogen peroxide, the hydrogen peroxide can be used in a temperature range of room temperature to 100° C., and preferably 40° C. or higher. When the temperature is 40° C. or higher, the oxidizing power works efficiently and opening holes can be formed efficiently. Furthermore, in the case of a liquid phase process, it is more effective to use light irradiation together with the liquid phase process.

A catalyst (a metal) included during the formation of a fibrous carbon nanohorn aggregate can be removed because the catalyst (the metal) is dissolved in nitric acid, sulfuric acid, and hydrochloric acid. Among these, hydrochloric acid is appropriate in view of the ease of use. Although a temperature in which a catalyst is dissolved can be appropriately selected, when the catalyst is fully removed, it is desirable to perform heating at 70° C. or higher. Furthermore, since there is a case in which the catalyst is covered with a carbon coating during the formation of a carbon nanohorn aggregate, it is desirable to perform a pretreatment to remove the carbon coating. It is desirable that heating be performed as the pretreatment at about 250° C. to 450° C. in air.

The crystallinity of the obtained spherical carbon nanohorn aggregate and fibrous carbon nanohorn aggregate can be improved using heat treatment in an inert gas, hydrogen, or a vacuum atmosphere. A heat treatment temperature can be 800° C. to 2000° C., preferably 1000° C. to 1500° C. Furthermore, surface functional groups formed through oxidation treatment which forms opening holes can also be removed through this heat treatment. This heat treatment temperature can be 150° C. to 2000° C. In order to remove carboxyl groups, hydroxyl groups, and the like as surface functional groups, the heat treatment temperature is preferably 150° C. to 600° C. When a carbonyl group and the like as a surface functional group is removed, the heat treatment temperature is preferably 600° C. or higher. Furthermore, a surface functional group can be removed through reduction. The reduction of the surface functional group can be performed under a gas atmosphere such as hydrogen or under a liquid atmosphere such as hydrazine.

In the dispersion liquid in the embodiment, the solvent is not particularly limited, but examples of the solvent include alcohol-based solvents such as water, methanol, ethanol, n-propanol, isopropanol, n-butanol, isobutanol, t-butanol, pentanol, and hexanol, aromatic hydrocarbon solvents such as benzene, toluene, xylene, and ethylbenzene, aliphatic or alicyclic hydrocarbon solvents such as hexane, heptane, and cyclohexane, organic halogen compound solvents such as methyl chloride, methyl bromide, methyl iodide, methylene dichloride, carbon tetrachloride, trichloroethylene, dichloromethane, dichloroethane, perchloroethylene, and ortho-dichlorobenzene, ether-based solvents such as diethyl ether and tetrahydrofuran, ester-based solvents such as ethyl acetate, butyl acetate, and propylene glycol monomethyl ether acetate, ketone-based solvents such as ester ethyl ketone, di-n-butyl ketone, and cyclohexanone, amide-based solvents such as N,N'-dimethylformanmide, N,N'-dimethylacetamide, and N-methyl-2-pyrrolidone, sulfoxide-based solvents such as dimethyl sulfoxide, and aliphatic carboxylic acid-based solvents such as acetic acid and propionic acid. One of these solvents independently or a combination of two or more thereof may be used.

In the dispersion liquid in the embodiment, the content of the fibrous carbon nanohorn aggregate is appropriately adjusted in accordance with the viscosity and the like obtained for the dispersion liquid, and for example, there is preferably 0.1 mg to 20 mg of the fibrous carbon nanohorn aggregate per 1 mL of solvent, and more preferably 1 mg to 5 mg.

When the content of the fibrous carbon nanohorn aggregate is 0.1 mg or more per 1 mL of a solvent, in a gas sensor which will be described later, a thin film obtained by drying a coating film formed by applying this dispersion liquid to a substrate can adsorb a gas. On the other hand, when the content of the fibrous carbon nanohorn aggregate is 20 mg or less per 1 mL of a solvent, the aggregation of the fibrous carbon nanohorn aggregate in the solvent is minimized.

Such a fibrous carbon nanohorn aggregate has superior conductivity and solvent dispersibility and a larger specific surface area than that of the spherical carbon nanohorn aggregate. Furthermore, it is expected that the fibrous carbon nanohorn aggregate will be able to be applied to various technical fields to a greater extent than that of the spherical carbon nanohorn aggregate.

Various general additives such as a binder, a dispersing agent, a plasticizer, a flow control agent, a thickener, and the like may be appropriately contained in the dispersion liquid in the embodiment within a range in which the effects of the invention are not inhibited. For example, it is desirable that a binder be contained in the dispersion liquid within a range in which the fibrous carbon nanohorn aggregate does not inhibit the adsorption of a gas to be detected which will be described later. Thus, this makes it difficult for the thin film formed using this dispersion to separate from the substrate or the like.

According to the dispersion liquid in the embodiment, since the fibrous carbon nanohorn aggregate having the above characteristics is uniformly dispersed in the solvent, even if two weeks or more have passed from the production, there is no significant aggregation and settling of a fibrous carbon nanohorn aggregate and a fibrous carbon nanohorn aggregate is stably dispersed in the solvent. Furthermore, according to the dispersion liquid in the embodiment, it is possible to form a thin film containing a fibrous carbon nanohorn aggregate and having a uniform thickness and a uniform content of a fibrous carbon nanohorn aggregate.

[Preparation Method of Dispersion Liquid]

In a preparation method of a dispersion liquid in the embodiment, a fibrous carbon nanohorn aggregate is dispersed in a solvent (a dispersion medium) using an ultrasonic dispersion treatment. Thus, a dispersion liquid obtained by uniformly dispersing the fibrous carbon nanohorn aggregate in the solvent is obtained.

In the preparation method of the dispersion liquid in the embodiment, an amount of fibrous carbon nanohorn aggregates added to the solvent is as follows.

Although a method for applying an ultrasonic dispersion treatment to a solvent added to a fibrous carbon nanohorn aggregate is not particularly limited, for example, a method of accommodating a solvent added to a fibrous carbon nanohorn aggregate in a vessel such as a beaker and applying ultrasonic waves to the vessel using an apparatus configured to perform an ultrasonic dispersion treatment is an exemplary example.

An apparatus configured to perform ultrasonic dispersion treatment is not particularly limited as long as the apparatus configured to perform ultrasonic dispersion treatment is an apparatus capable of applying ultrasonic waves to a solvent containing a fibrous carbon nanohorn aggregate accommodated in a vessel, and for example, an ultrasonic cleaner and the like are exemplary examples.

Although a time during which ultrasonic dispersion treatment is performed is not particularly limited, the time is appropriately adjusted in accordance with an amount of fibrous carbon nanohorn aggregate with respect to a solvent and the like.

Although a temperature at which ultrasonic dispersion treatment is performed is not particularly limited, the temperature is appropriately adjusted to a temperature range in which a solvent does not evaporate.

According to the preparation method of the dispersion liquid in the embodiment, a dispersion liquid obtained by uniformly and stably dispersing a fibrous carbon nanohorn aggregate in a solvent can be obtained.

[Gas Sensor]

(First Exemplary Embodiment)

FIG. 1 is a schematic diagram showing a gas sensor in an embodiment.

A gas sensor 10 in the embodiment includes an adsorbent 11 which includes a fibrous carbon nanohorn aggregate in which a plurality of single-walled carbon nanohorns are aggregated in a fibrous form and a measurement unit 12 which measures the electrical characteristics of the adsorbent 11. Furthermore, as shown in FIG. 1, for example, the adsorbent 11 is provided on one surface (an upper surface) 13a of a substrate 13. In addition, the gas sensor 10 in the embodiment may include a current (voltage) application apparatus (not shown) configured to apply a constant current (a voltage) to the adsorbent 11 so that a gas to be detected is adsorbed on the adsorbent 11 as will be described later.

For example, the adsorbent 11 is formed of a thin film obtained by drying a coating film formed by applying the above-described dispersion liquid to one surface 13a of the substrate 13. That is to say, the adsorbent 11 is a thin film formed of a fibrous carbon nanohorn aggregate. The adsorbent 11 is a thin film having a uniform thickness and a uniform content of a fibrous carbon nanohorn aggregate. Since the thickness of the adsorbent 11 is uniform, the conductivity (surface resistance) is also uniform as a whole. In addition, since the adsorbent 11 is formed of a fibrous carbon nanohorn aggregate, the adsorbent 11 is a porous body having a plurality of fine holes throughout and has a portion (an adsorption site) configured to adsorb a gas at a molecular level which will be described later.

Although a thickness of the adsorbent 11 is not particularly limited, for example, the thickness is preferably 100 nm to 100 μm, and more preferably 200 nm to 5 μm.

When the thickness of the adsorbent 11 is 200 nm or more, it is possible to adsorb a sufficient amount of gas to be detected for detection. On the other hand, when the thickness of the adsorbent 11 is 5 μm or less, peeling of the adsorbent 11 from the substrate 13 due to scratching or the like can be prevented.

The measurement unit 12 is connected to the adsorbent 11, for example, via a lead wire 14. Furthermore, the lead wire 14 is brought into contact with the adsorbent 11 using a terminal.

The measurement unit 12 is for measuring the conductivity (for example, surface resistance (sheet resistance)) of the adsorbent 11 which changes when a gas to be detected is adsorbed. For example, a sheet resistance measurement apparatus or the like is used as the measurement unit 12. The surface resistance of the adsorbent 11 is measured, for example, by a four terminal method using a sheet resistance measurement apparatus.

The substrate 13 is not particularly limited as long as the substrate 13 is made of an insulating material. Examples of materials which can be used for the substrate 13 include insulating polymer materials, polyethylene terephthalate (PET), polyimide (PI), polyethylene naphthalate (PEN), polyethersulfone (PES), polyetheretherketone (PEEK), polycarbonate (PC), polypropylene (PP), polyamide (PA), polyacrylic (PAC), acrylic, amorphous polyolefin resins, cyclic polyolefin resins, aliphatic cyclic polyolefin, norbornene thermoplastic resins, Parylene, and the like. Furthermore, examples of materials which can be used for the substrate 13 include phenol paper, epoxy paper, glass epoxy materials, quartz, soda glass, and heat resistant glass for printed wiring boards and the like. Furthermore, examples of materials which can be used for the substrate 13 include silicon oxide, silicon nitride, aluminum oxide, hafnium oxide, zirconium oxide, and titanium oxide. The substrate 13 may be made of one of these insulating materials or may be a laminate made of two or more of these insulating materials.

Examples of the lead wire 14 include those generally used in electrical circuits.

The gas sensor 10 in the embodiment is, for example, a two terminal resistance change type gas sensor in which the adsorbent 11 formed of a thin film provided on the one surface 13a of the substrate 13 functions as a gas sensitive part. When a gas to be detected is supplied to the adsorbent 11 that is a gas sensitive part in a state in which a constant current (a voltage) is applied to the adsorbent 11, gas molecules are adsorbed on the adsorbent 11 and the conductivity (a resistance value) of the adsorbent 11 changes. Furthermore, when the supply of a gas to be detected is stopped, gas molecules adsorbed on the adsorbent 11 are desorbed and the conductivity of the adsorbent 11 returns to the original state thereof. By measuring a change in the conductivity of the adsorbent 11 in the process of adsorption and desorption of such a gas to be detected using the measurement unit 12, the gas to be detected can be detected.

In the gas sensor 10 in the embodiment, examples of a gas to be detected include nitrogen oxides ($NO_x$), carbon oxides ($CO_x$), sulfur oxides ($SO_x$), ozone, ammonia, oxygen, hydrogen, halogens, hydrocarbons such as hexane, alcohols such as ethanol, methanol, isopropyl alcohol, aldehydes, ethers, ketones such as acetone and methyl ethyl ketone, nitro compounds, aromatic compounds such as benzene and toluene, organic halogen compounds such as dichloroethane, and the like.

According to the gas sensor in the embodiment, a gas to be detected can be detected when the measurement unit 12 measures a change in the conductivity of the adsorbent 11 in the process of adsorption and desorption of the gas to be detected.

(Manufacturing Method of Gas Sensor)

A manufacturing method of the gas sensor in the embodiment includes a step of applying a dispersion liquid containing a fibrous carbon nanohorn aggregate to a substrate and forming an adsorbent containing a fibrous carbon nanohorn aggregate.

To be more specific, the manufacturing method of the gas sensor in the embodiment includes a step of forming a coating film by applying the above-described dispersion liquid to the one surface 13a of the substrate 13 and forming an adsorbent formed of a thin film of a fibrous carbon nanohorn aggregate by drying this coating film.

A method of applying a dispersion liquid to the substrate 13 is not particularly limited and examples of the application method include conventional wet coating methods such as a bar coating method, a flow coating method, a dip coating method, a spin coating method, a roll coating method, a spray coating method, a meniscus coating method, a gravure coating method, a suction coating method, and a brush coating method.

A method for drying a coating film is not particularly limited and examples of the drying method include a method of performing drying at 50° C. to 250° C. using a general oven or a method of performing drying at room temperature.

According to the manufacturing method of the gas sensor in the embodiment, a gas sensor which includes a fibrous carbon nanohorn aggregate and the adsorbent 11 including a uniformly dispersed fibrous carbon nanohorn aggregate is obtained.

[Gas Sensor]

(Second Exemplary Embodiment)

Figure 2:
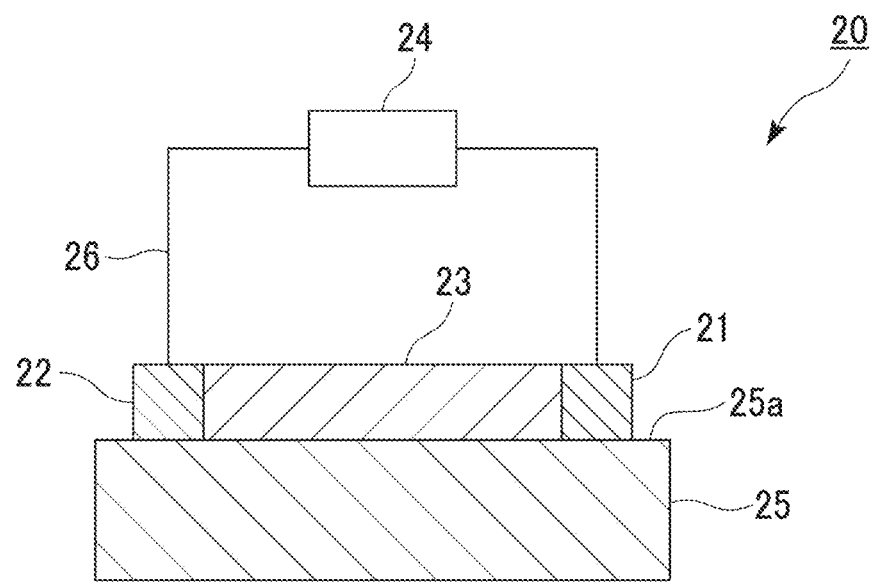
FIG. 2 is a schematic diagram showing a second exemplary embodiment of the gas sensor.

FIG. 2 is a schematic diagram showing a gas sensor according to an embodiment.

A gas sensor 20 in the embodiment includes a plurality of electrodes 21 and 22, an adsorption layer 23 provided between the electrodes 21 and 22, and a measurement unit 24 which measures the electrical characteristics of the adsorption layer 23. Furthermore, as shown in FIG. 2, the electrodes 21 and 22 and the adsorption layer 23 are provided, for example, on one surface (an upper surface) 25a of a substrate 25. In addition, the electrode 21 and the electrode 22 are provided with a predetermined distance therebetween on the one surface 25a of the substrate 25. Moreover, the gas sensor 20 in the embodiment may include a current (voltage) application apparatus (not shown) configured to apply a constant current (a voltage) to the adsorption layer 23 so that a gas to be detected is adsorbed on the adsorption layer 23 as will be described later.

The electrodes 21 and 22 are not particularly limited as long as the electrodes 21 and 22 are formed of a conductor (a conductive material). Examples of materials which can be used for the electrodes 21 and 22 include metals (including nanoparticles of gold, silver, and copper), indium tin oxide (ITO), metal oxides such as zinc oxide and tin oxide, conductive polymers, carbon nanotubes, carbon-based conductive materials such as graphene, and the like.

The adsorption layer 23 is formed of, for example, a thin film obtained by drying a coating film formed by applying the above-described dispersion liquid to the one surface 25a of the substrate 25. That is to say, the adsorption layer 23 is a thin film formed of a fibrous carbon nanohorn aggregate. The adsorption layer 23 is a thin film having a uniform thickness and a uniform content of fibrous carbon nanohorn aggregates. Since the adsorption layer 23 has a uniform thickness, the conductivity (surface resistance) of the adsorption layer 23 is also uniform. Furthermore, since the adsorption layer 23 is formed of a fibrous carbon nanohorn aggregate, the adsorption layer 23 is a porous body having a plurality of fine holes throughout and has a portion (an adsorption site) configured to adsorb a gas at a molecular level which will be described later.

A thickness of the adsorption layer 23 is not particularly limited, but is, for example, preferably 100 nm to 100 μm, and more preferably 200 nm to 5 μm.

If the thickness of the adsorption layer 23 is 200 nm or more, it is possible to adsorb a sufficient amount of gas to be detected for detection. On the other hand, if the thickness of the adsorption layer 23 is 5 μm or less, peeling of the adsorption layer 23 from the substrate 25 due to scratching or the like can be prevented.

The measurement unit 24 is connected to, for example, the electrodes 21 and 22 via the lead wire 26. Furthermore, the lead wire 26 is brought into contact with the electrodes 21 and 22 using a terminal. That is to say, the measurement unit 24 is connected to the adsorption layer 23 via the lead wire 26 and the electrodes 21 and 22.

The measurement unit 22 is for measuring the conductivity (for example, surface resistance (sheet resistance)) of the adsorption layer 23 which changes due to the adsorbed gas to be detected. As the measurement unit 24, the same measurement unit 12 as described above is used.

As the substrate 25, the same substrate 13 as described above is used.

As the lead wire 26, the same lead wire 14 as described above is used.

The gas sensor 20 in the embodiment is, for example, a two terminal resistance change type gas sensor in which the adsorption layer 23 formed of a thin film provided on the one surface 25a of the substrate 25 functions as a gas sensitive part. When a gas to be detected is supplied to the adsorption layer 23 that is a gas sensitive part in a state in which a constant current (a voltage) is applied to the electrode 21 and the electrode 22, gas molecules adsorb to the adsorption layer 23 and the conductivity (the resistance value) of the adsorption layer 23 changes. Furthermore, when the supply of a gas to be detected is stopped, gas molecules which have been adsorbed on the adsorption layer 23 desorb and the conductivity of the adsorption layer 23 returns to the original state thereof. By measuring such a change in conductivity of the adsorption layer 23 in the process of adsorption and desorption of the gas to be detected using the measurement unit 24, it is possible to detect the gas to be detected.

In the gas sensor 20 in the embodiment, examples of the gas to be detected include the same gases as in the gas sensor 10 in the first exemplary embodiment.

According to the gas sensor in the embodiment, by measuring a change in conductivity of the adsorption layer 23 in the process of adsorption and desorption of a gas to be detected using the measurement unit 24, it is possible to detect the gas to be detected.

(Manufacturing Method of Gas Sensor)

A manufacturing method of the gas sensor in the embodiment includes a step of applying a dispersion liquid containing a fibrous carbon nanohorn aggregate to a substrate and forming an adsorption layer containing a fibrous carbon nanohorn aggregate.

To be more specific, the manufacturing method of the gas sensor in the embodiment includes a step of forming a coating film by applying the above-described dispersion liquid between the electrode 21 and the electrode 22 formed above the one surface 25a of the substrate 25 in advance and forming the adsorption layer 23 formed of a thin film containing a fibrous carbon nanohorn aggregate by drying this coating film.

As a method of applying a dispersion liquid to the substrate 25, the same method as the applying method in the first exemplary embodiment may be used.

As a method of drying a coating film, the same method as the drying method in the first exemplary embodiment may be used.

According to the manufacturing method of the gas sensor in the embodiment, a gas sensor including the adsorption layer 23 which contains a fibrous carbon nanohorn aggregate and in which a fibrous carbon nanohorn aggregate is uniformly dispersed is obtained.

[Working Examples]

Although the present invention will be described in more detail below by way of working examples and comparative examples, the present invention is not limited to the following working examples.

[Working Example 1]

A powder obtained by subjecting $CO_2$ laser ablation to a catalyst-containing carbon target containing 1% by mass of iron as a catalyst under a nitrogen atmosphere and containing a fibrous carbon nanohorn aggregate and a spherical carbon nanohorn aggregate mixed together (hereinafter referred to as a "carbon nanohorn aggregate powder") was obtained. Description will be provided in detail below. A catalyst-containing carbon target containing 1% by mass of iron was placed in a vessel under a nitrogen atmosphere. A temperature in the vessel was room temperature. A gas flow rate in the vessel was adjusted to 10 L/cm². The catalyst-containing carbon target was rotated at 2 rpm. The rotating catalyst-containing carbon target was irradiated with a $CO_2$ gas laser beam having an energy density of 100 kW/cm² to 300 kW/cm². A pressure in the vessel was controlled to be 933.254 hPa to 1266.559 hPa (700 Torr to 950 Torr).

1 mL of ethanol (purity: 99.5%; an EL grade; manufactured by Kanto Chemical Co., Ltd.) was added to 4 mg of the carbon nanohorn aggregate powder obtained as described above in a glass beaker.

A dispersion liquid was prepared by applying ultrasonic waves to the glass beaker having the above-described mixture accommodated therein for 30 minutes using an ultrasonic cleaner (trade name: VS-100III manufactured by As One Corporation) and subjecting dispersion treatment to the carbon nanohorn aggregate powder in ethanol.

A coating film was formed above a polyimide substrate having a thickness of 75 μm and a vertical length of 1 cm×a horizontal length of 1 cm by dropping-cast 100 μL of the obtained dispersion liquid above this polyimide substrate.

Figure 3:
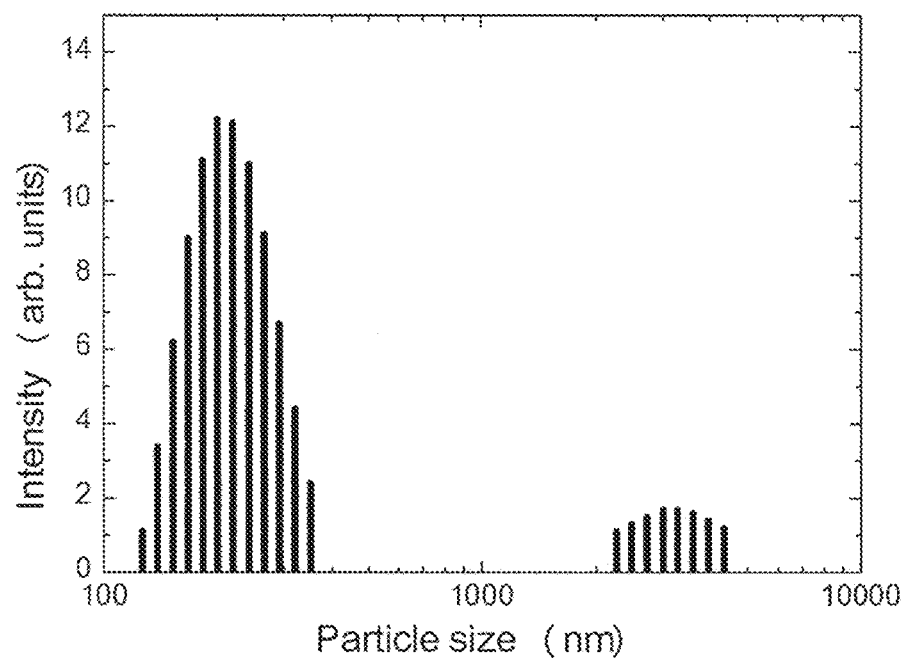
FIG. 3 is a diagram showing a particle size distribution of a carbon nanohorn aggregate powder in a solvent in Working Example 1.

A particle size distribution of the obtained dispersion liquid was measured using a dynamic light scattering method. FIG. 3 is a diagram showing a particle size distribution of a carbon nanohorn aggregate powder in a solvent. From FIG. 3, particle size distributions in a region of 100 nm to 300 nm and 2000 nm to 5000 nm was confirmed. 100 nm to 300 nm correspond to spherical carbon nanohorn aggregates and 2000 nm to 5000 nm correspond to fibrous carbon nanohorn aggregates. In addition, it could be seen that the spherical carbon nanohorn aggregates and the fibrous carbon nanohorn aggregates are substantially mono-dispersed in ethanol. Therefore, it could be seen that the fibrous carbon nanohorn aggregates have a high dispersibility.

A thin film formed of a carbon nanohorn aggregate powder was formed above the polyimide substrate by drying this coating film at 65° C. using an oven.

Figure 4:
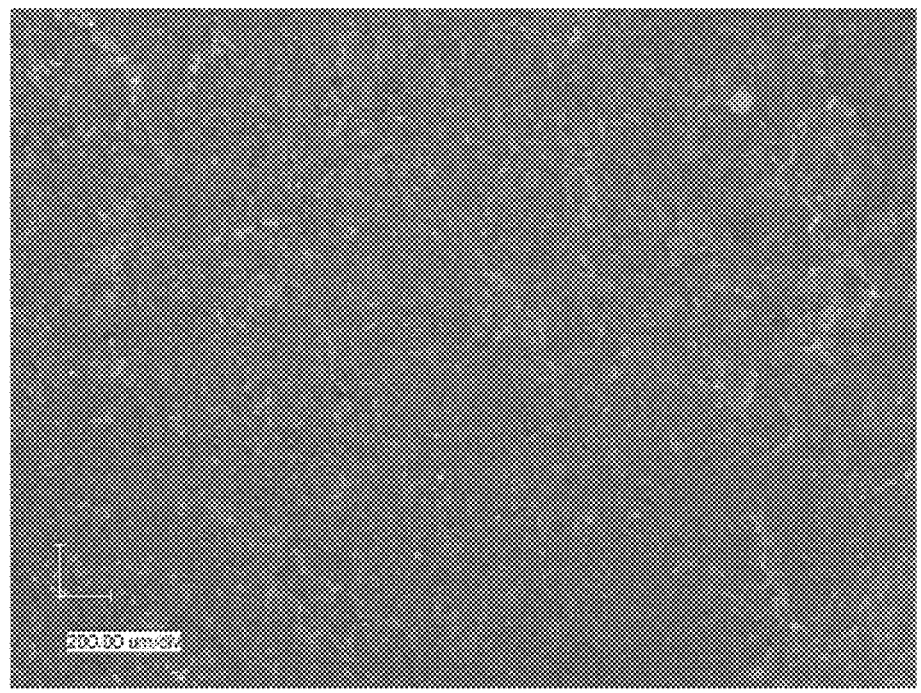
FIG. 4 is an optical micrograph of a thin film in Working Example 1.

The obtained thin film was observed using an optical microscope (trade name: VHX-100 manufactured by KEYENCE Corporation). FIG. 4 shows an optical micrograph.

[Comparative Example 1]

1 mL of ethanol (purity: 99.5%; an EL grade; manufactured by Kanto Chemical Co., Ltd.) was added to 4 mg of a single-walled carbon nanotube powder (trade name: SG65i manufactured by South West Nano Technologies) in a the glass beaker.

A dispersion liquid was prepared by applying ultrasonic waves to the glass beaker having the above-described mixture accommodated therein for 150 minutes using an ultrasonic cleaner (trade name: VS-100III manufactured by As One Corporation) and subjecting dispersion treatment to the single-walled carbon nanotube powder in ethanol. Since aggregates significantly remained in the single-walled carbon nanotube powder, a dispersion treatment time was 150 minutes.

A coating film was formed above a polyimide substrate having a thickness of 75 μm and a vertical length of 1 cm×a horizontal length of 1 cm by dropping-cast 100 μL of the obtained dispersion liquid above this polyimide substrate.

A thin film formed of a carbon nanohorn aggregate powder was formed above the polyimide substrate by drying this coating film at 65° C. using an oven.

Figure 5:
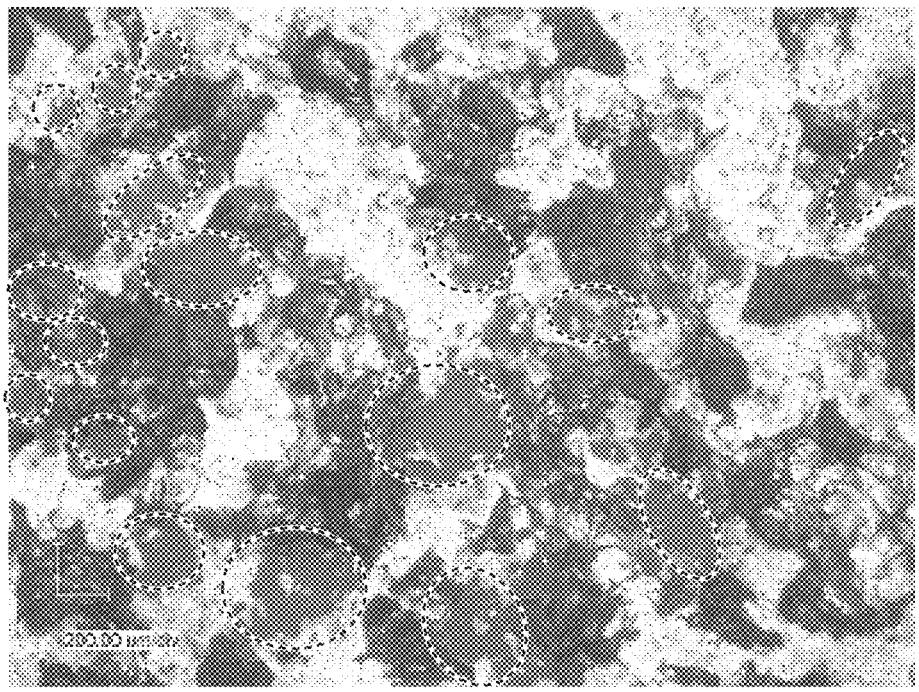
FIG. 5 is an optical micrograph of a thin film in Comparative Example 1.

The obtained thin film was observed using an optical microscope (trade name: VHX-100 manufactured by KEYENCE Corporation). FIG. 5 shows an optical micrograph.

From the optical micrograph of FIG. 5, the thin film formed of the single-walled carbon nanotube powder of Comparative Example 1 was significantly non-uniform and discontinuous. For this reason, in Comparative Example 1, as indicated by a black dashed line in FIG. 5, it was confirmed that an exposed portion in the polyimide substrate (a portion which was not covered with a thin film made of a single-walled carbon nanotube powder in the polyimide substrate) was present.

On the other hand, it was confirmed from the optical micrograph of FIG. 4 that the thin film made of the carbon nanohorn aggregate powder of Working Example 1 was uniform and formed to cover the entire polyimide substrate. That is to say, it was seen that the thin film made of the carbon nanohorn aggregate powder of Working Example 1 was a more uniform film than the thin film made of the single-walled carbon nanotube powder of Comparative Example 1.

[Working Example 2]

(Preparation of Dispersion Liquid)

1 mL of ethanol (purity: 99.5%; an EL grade; manufactured by Kanto Chemical Co., Ltd.) was added to 4 mg of a carbon nanohorn aggregate powder in a glass beaker.

A dispersion liquid was prepared by applying ultrasonic waves to the glass beaker having the above-described mixture accommodated therein for 30 minutes using an ultrasonic cleaner (trade name: VS-100III manufactured by As One Corporation) and subjecting dispersion treatment to the carbon nanohorn aggregate powder in ethanol.

When the obtained dispersion liquid was allowed to stand at room temperature for two weeks, no significant aggregation or sedimentation of a carbon nanohorn aggregate powder was observed. That is to say, it was confirmed that the carbon nanohorn aggregate powder was stably dispersed in ethanol.

(Preparation of Gas Sensor)

A coating film was formed by filling a Hamilton gas tight syringe (type: 1705TLL) with the obtained dispersion liquid and applying the obtained dispersion liquid above a substrate linearly using a dispensing apparatus (trade name: FAD-320S and NANO MASTER SMP-II manufactured by Musashi Engineering Co., Ltd.).

As a syringe needle, a double thread plastic needle (trade name: DPN-20G-1 manufactured by Musashi Engineering Co., Ltd.) was used.

An interval between the substrate and a distal end of the syringe needle was set to 0.1 mm, a syringe sweep speed was set to 8.0 mm/s, and a stage temperature was set to 40° C.

Droplets (a dispersion liquid) were discharged onto the substrate under the conditions of a normal mode 24 (a motor rotational speed) described in the manual of a dispensing apparatus (trade name: NANO MASTER SMP-III manufactured by Musashi Engineering Co., Ltd.).

As a substrate to which the dispersion liquid is applied, a polyimide substrate having a thickness of thickness of 75 μm and a vertical length of 1 cm×a horizontal length of 1 cm, on which a plurality of gold electrodes having a thickness of 50 nm and a width of 100 μm are vapor-deposited in parallel was used.

Figure 6:
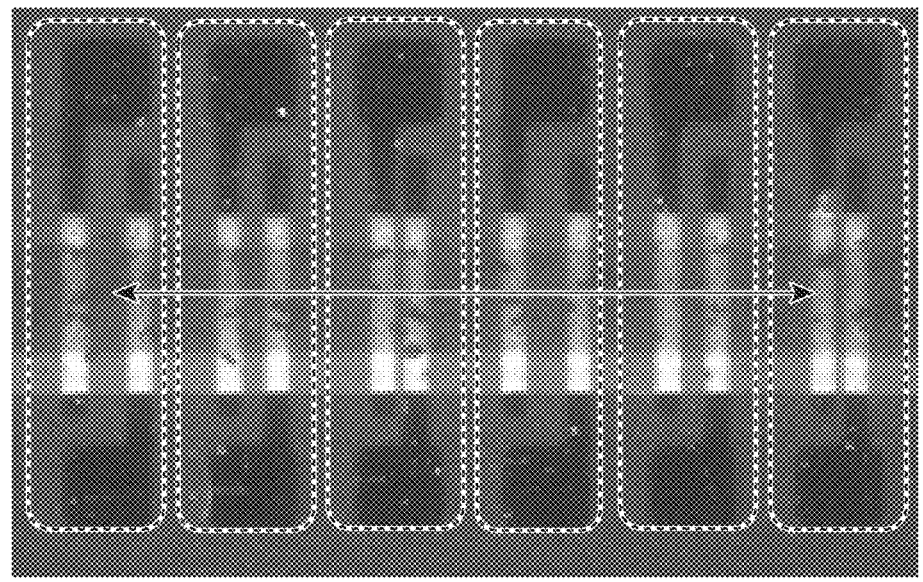
FIG. 6 is an optical micrograph of a gas sensor in Working Example 2.

The dispersion liquid was applied in a direction orthogonal to a longitudinal direction of the gold electrodes provided above the polyimide substrate (in a direction of an arrow shown in FIG. 6). It should be noted that, in order to ensure sufficient conductivity of the thin film obtained by drying the coating film, linear application of the dispersion liquid to the substrate was repeated 36 times.

Subsequently, a gas sensor was obtained by drying this coating film 65° C. using an oven and forming a thin film made of a carbon nanohorn aggregate powder above the polyimide substrate.

The obtained gas sensor was observed using an optical microscope (trade name: VHX-100 manufactured by KEYENCE Corporation). FIG. 6 shows an optical micrograph. In FIG. 6, a region surrounded by a broken line corresponds to one gas sensor. Furthermore, a band-like region at a center in FIG. 6 is a thin film made of a carbon nanohorn aggregate powder.

It was confirmed from the optical micrograph of FIG. 6 that the obtained thin film is relatively high uniform and a drawn end (an end portion of the thin film formed through linear application of the dispersion liquid described above) also has excellent linearity.

(Gas Adsorption Test)

Ethanol gas was supplied to the gas sensor obtained as described above using the following method.

A bubbling method was used as an ethanol gas supply method and the flow rate of ethanol gas was controlled by a mass flow controller (trade name: SEC-4500M and SEC-E40 manufactured by Horiba Estec Co., Ltd.)

First, nitrogen gas was bubbled into ethanol (purity: 99.5%; an EL grade; manufactured by Kanto Chemical Co., Ltd.) at a temperature of 20° C. under normal pressure to obtain ethanol vapor having a concentration of 6%. Here, the concentration of ethanol vapor (ethanol gas) was controlled by mixing ethanol and nitrogen gas at a predetermined flow ratio.

Also, the total flow rate of a gas supplied to the gas sensor was set to be 1.0 L/min.

A change in resistance value of the gas sensor along with the supply and the stop of ethanol gas was measured as follows.

The gas sensor obtained as described above is stored in a chamber and a semiconductor parameter analyzer (trade name: Agilent 4155C manufactured by Agilent Technologies) was connected to gold electrodes of this gas sensor via a lead wire. A voltage was measured with a bias current of 5 μA applied between the two gold electrodes. Furthermore, data points were acquired at an integration time of 240 ms and at 0.5 second intervals.

As a measurement procedure, first, a resistance value of the gas sensor was measured in a state in which only nitrogen gas was supplied and this was used as a reference value $R_0$. Subsequently, a resistance value R of the gas sensor was measured in a state in which ethanol gas was supplied.

Figure 7:
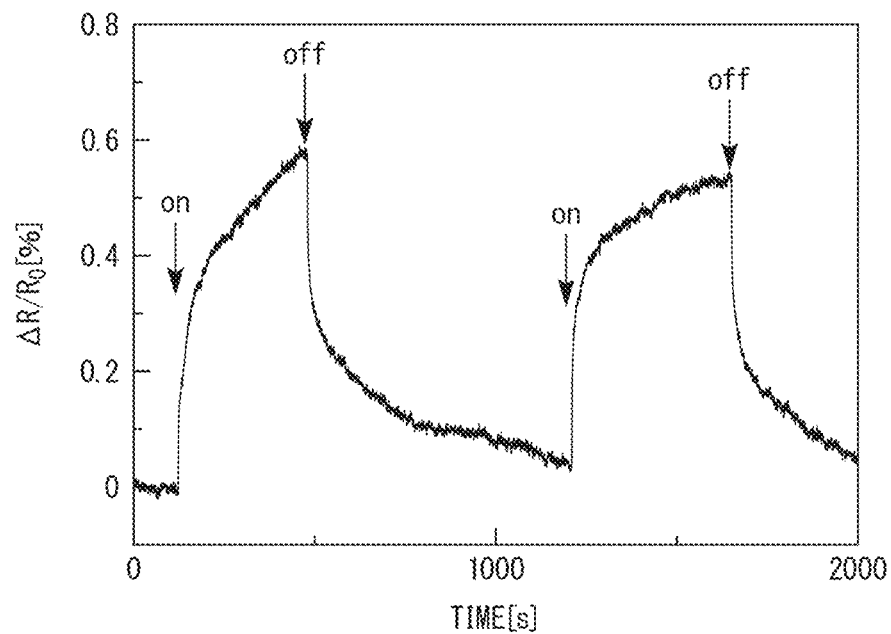
FIG. 7 is a diagram showing a change in resistance value of the gas sensor in Working Example 2.

It should be noted that, when ethanol gas was supplied into the chamber, the concentration of the ethanol gas was controlled to be 275 ppm. FIG. 7 shows the results. In FIG. 7, a vertical axis indicates a resistance value R with respect to a reference value $R_0$ ($\Delta R/R_0$ (%)) and a horizontal axis indicates an elapsed time.

From the results in FIG. 7, a significant change in resistance value is confirmed immediately after the start of supply of ethanol gas (in FIG. 7, on represents the start of supply of ethanol gas) and a change in resistance value about 0.2% and a change in resistance value about 0.5% were confirmed in 5 seconds and after 4 minutes after the start of supply, respectively. Furthermore, after stopping the supply of ethanol gas (in FIG. 7, off represents the stop of supply of ethanol gas), the reversibility in which the resistance value changes in a direction of an initial state was also confirmed.

From the above results, it was confirmed that a thin film sensitive to a gas to be detected could be formed by an application method using a simple apparatus such as a dispensing apparatus.

[Working Example 3]

(Preparation of Gas Sensor)

A gas sensor was manufactured in the same manner as in Working Example 2.

(Gas Adsorption Test)

1,2-Dichloroethane was supplied to the gas sensor obtained as described above in the following manner.

A bubbling method was used as a method of supplying 1,2-dichloroethane and the flow rate of 1,2-dichloroethane was controlled using a mass flow controller (trade name: SEC-4500M and SEC-E40 manufactured by Horiba Estec Co., Ltd.).

First, nitrogen gas was bubbled into 1,2-dichloroethane (purity: 99.5% or higher; manufactured by Kanto Chemical Co., Ltd.) at a temperature of 20° C. under normal pressure and 1,2-dichloroethane vapor having a concentration of 8% was obtained. Here, the concentration of 1,2-dichloroethane vapor (1,2-dichloroethane) was controlled by mixing 1,2-dichloroethane and nitrogen gas at a predetermined flow ratio.

Also, the total flow rate of a gas supplied to the gas sensor was set to 1.2 L/min.

A change in the resistance value of the gas sensor along with the supply and stop of 1,2-dichloroethane was measured as follows.

The gas sensor obtained as described above was stored in the chamber and a semiconductor parameter analyzer (trade name: Agilent 4155C manufactured by Agilent Technologies) was connected to gold electrodes of the gas sensor via a lead wire. A voltage was measured with a 5 μA of bias current applied between two gold electrodes. Furthermore, data points were acquired at an integration time of 500 ms at 1 second intervals.

As a measurement procedure, first, a resistance value of the gas sensor was measured in a state in which only nitrogen gas was supplied and this was used as a reference value $R_0$. Subsequently, 1,2-dichloroethane was supplied for only 30 seconds (a lower arrow portion in FIG. 8) and a resistance value R of the gas sensor at that time was measured. After that, only nitrogen gas was supplied to the gas sensor. After confirming the resistance value of the gas sensor recovered to the reference value $R_0$, the same measurement was performed by changing the concentration of 1,2-dichloroethane in the chamber.

Figure 8:
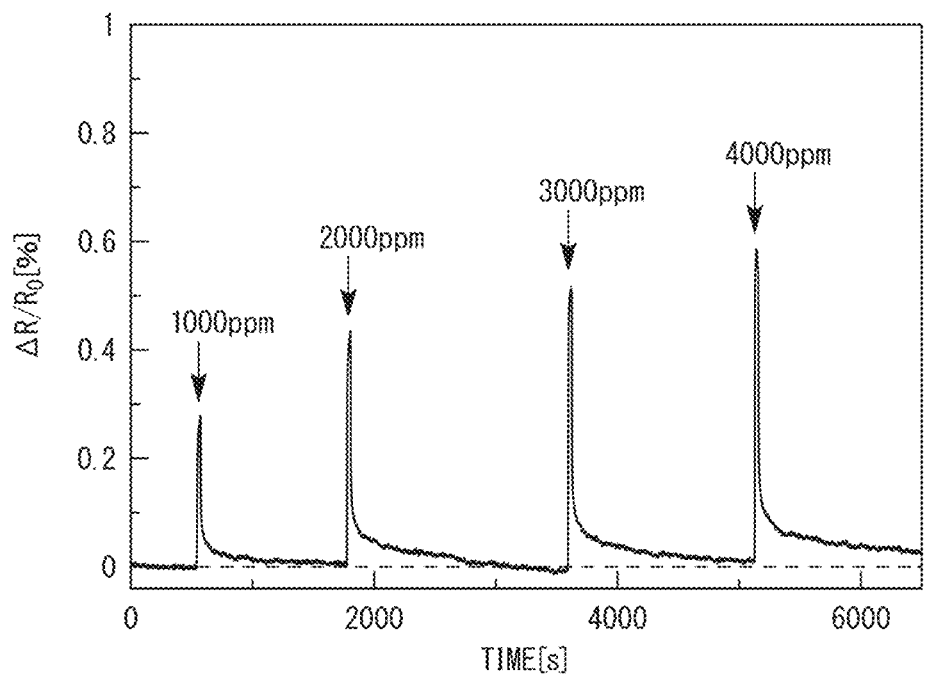
FIG. 8 is a diagram showing a change in resistance value of a gas sensor in Working Example 3.

It should be noted that, when 1,2-dichloroethane was supplied into the chamber, the concentration of 1,2-dichloroethane was controlled to be 1000 ppm, 2000 ppm, 3000 ppm, and 4000 ppm. FIG. 8 shows the results. In FIG. 8, a vertical axis indicates a resistance value R with respect to a reference value $R_0$ ($\Delta R/R_0$ (%)) and a horizontal axis indicates an elapsed time.

From the results of FIG. 8, a change in positive resistance value was confirmed with the supply of 1,2-dichloroethane. Furthermore, when the concentration of 1,2-dichloroethane is higher, a change in resistance value increases. In addition, it was confirmed that the gas sensor of this example could be used as a sensor for evaluating the concentration of 1,2-dichloroethane. Moreover, after the supply of 1,2-dichloroethane was stopped after the start of supply thereof, it was confirmed that the resistance value of the gas sensor was recovered to the reference value $R_0$ and the gas sensor of this example could be used repeatedly.

[Working Example 4]

(Manufacturing of the Gas Sensor)

A gas sensor was manufactured in the same manner as in Working Example 2.

(Gas Adsorption Test)

A resistance value of the gas sensor was measured in the same manner as in Working Example 3 except that acetone (purity: 99.8%; an EL grade; manufactured by Kanto Chemical Co., Ltd.) is used as a gas to be detected supplied to the gas sensor obtained as described above.

Figure 9:
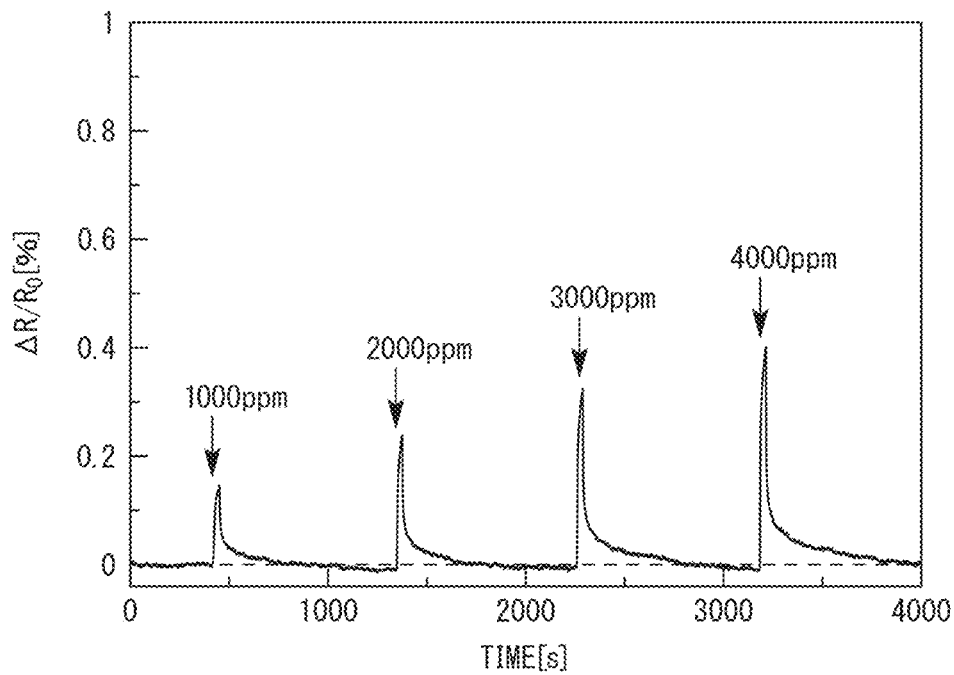
FIG. 9 is a diagram showing a change in resistance value of a gas sensor in Working Example 4.

FIG. 9 shows the results. In FIG. 9, a vertical axis indicates a resistance value R with respect to a reference value $R_0$ ($\Delta R/R_0$ (%)) and a horizontal axis indicates an elapsed time.

From the results of FIG. 9, a change in positive resistance value was confirmed with the supply of acetone. Furthermore, when the concentration of acetone is higher, a change in resistance value increases. In addition, it was confirmed that the gas sensor of this example could be used as a sensor for evaluating the concentration of acetone. Moreover, after the supply of acetone was stopped after the start of supply thereof, it was confirmed that the resistance value of the gas sensor was recovered to the reference value $R_0$ and the gas sensor of this example could be used repeatedly.

[Working Example 5]

(Preparation of Gas Sensor)

A gas sensor was manufactured in the same manner as in Working Example 2.

(Gas Adsorption Test)

A resistance value of the gas sensor was measured in the same manner as in Working Example 3 except that n-hexane (purity: 99% or higher; manufactured by Sigma-Aldrich) is used as a gas to be detected supplied to the gas sensor obtained as described above.

Figure 10:
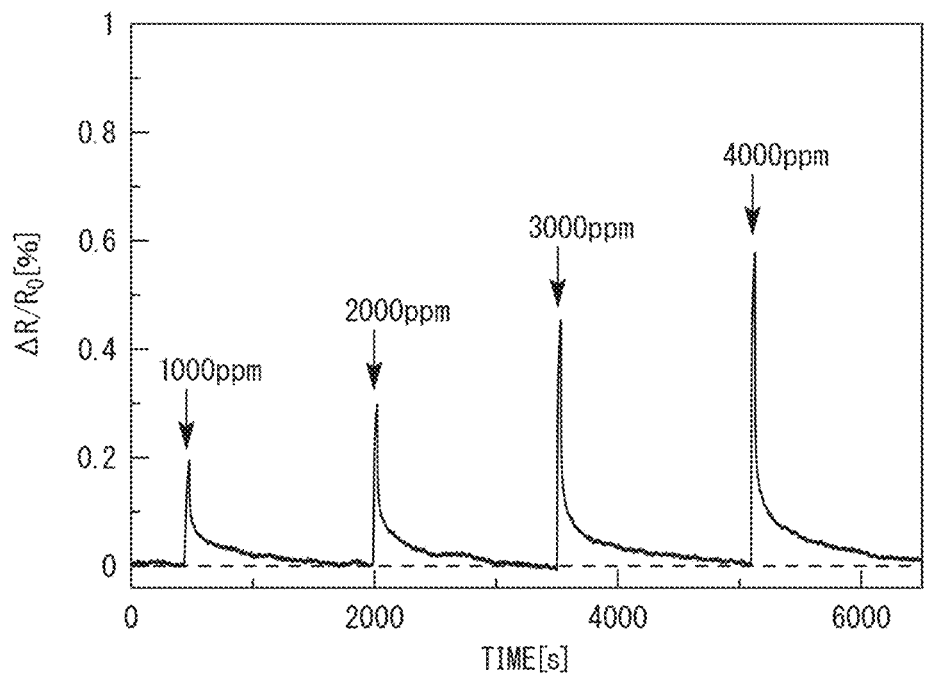
FIG. 10 is a diagram showing a change in resistance value of a gas sensor in Working Example 5.

FIG. 10 shows the results. In FIG. 10, a vertical axis indicates a resistance value R with respect to a reference value $R_0$ ($\Delta R/R_0$ (%)) and a horizontal axis indicates an elapsed time.

From the results of FIG. 10, a change in positive resistance value was confirmed with the supply of n-hexane. Furthermore, when the concentration of n-hexane is higher, a change in resistance value increases. In addition, it was confirmed that the gas sensor of this example could be used as a sensor for evaluating the concentration of n-hexane. Moreover, after the supply of n-hexane was stopped after the start of supply thereof, it was confirmed that the resistance value of the gas sensor was recovered to the reference value $R_0$ and the gas sensor of this example could be used repeatedly.

[Working Example 6]

(Manufacturing of Gas Sensor)

A gas sensor was manufactured in the same manner as in Working Example 2.

(Gas Adsorption Test)

A resistance value of the gas sensor was measured in the same manner as in Working Example 3 except that ethanol (purity: 99.5%; an EL grade; manufactured by Kanto Chemical Co., Ltd.) is used as a gas to be detected supplied to the gas sensor obtained as described above.

Figure 11:
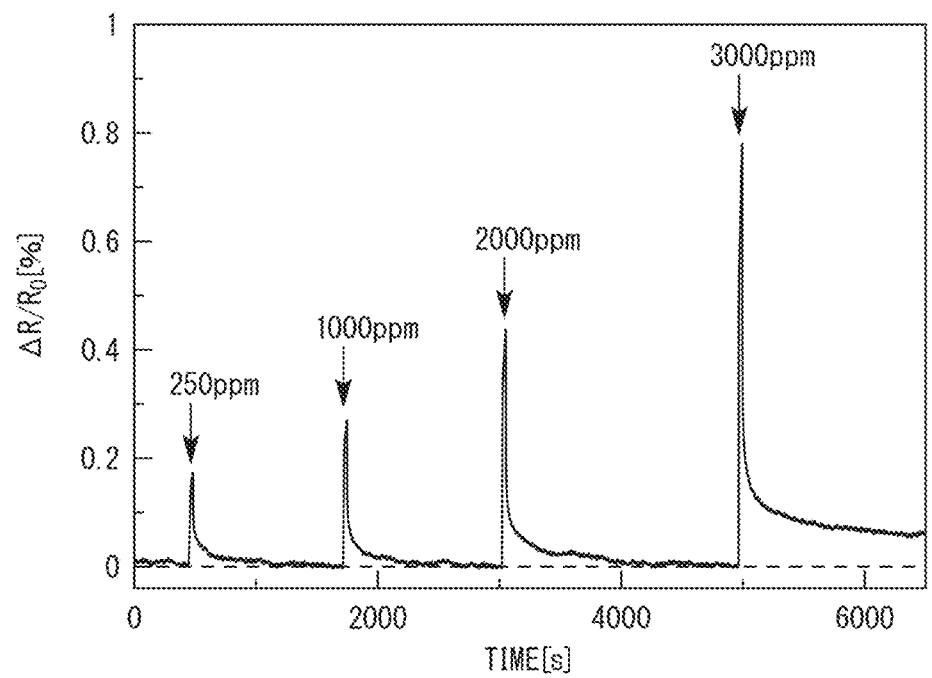
FIG. 11 is a diagram showing a change in resistance value of a gas sensor in Working Example 6.

It should be noted that, when ethanol was supplied into the chamber, the concentration of ethanol was controlled to be 250 ppm, 1000 ppm, 2000 ppm, and 3000 ppm. FIG. 11 shows the results. In FIG. 11, a vertical axis indicates a resistance value R with respect to a reference value $R_0$ ($\Delta R/R_0$ (%)) and a horizontal axis indicates an elapsed time.

From the results of FIG. 11, a change in positive resistance value was confirmed with the supply of ethanol. Furthermore, when the concentration of ethanol is higher, a change in resistance value increases. In addition, it was confirmed that the gas sensor of this example could be used as a sensor for evaluating the concentration of ethanol. Moreover, after the supply of ethanol was stopped after the start of supply thereof, it was confirmed that the resistance value of the gas sensor was recovered to the reference value $R_0$ and the gas sensor of this example could be used repeatedly.

[Working Example 7]

(Manufacturing of Gas Sensor)

A gas sensor was manufactured in the same manner as in Working Example 2.

(Gas Adsorption Test)

A resistance value of the gas sensor was measured in the same manner as in Working Example 3 except that toluene (purity: 99.7% or higher; manufactured by Kanto Chemical Co., Ltd.) is used as a gas to be detected supplied to the gas sensor obtained as described above.

Figure 12:
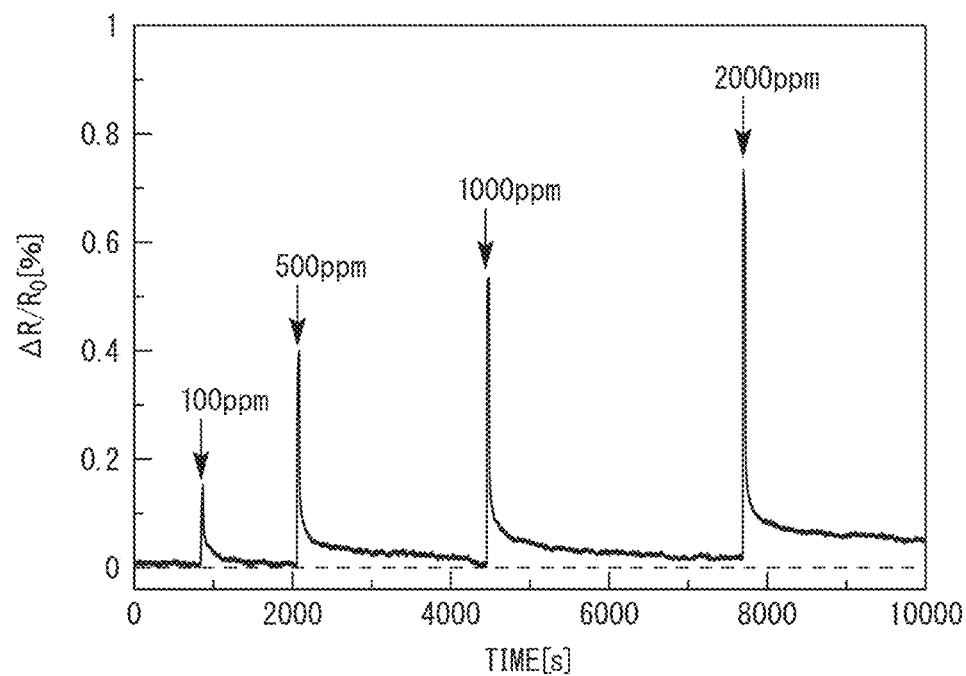
FIG. 12 is a diagram showing a change in resistance value of a gas sensor in Working Example 7.

It should be noted that, when toluene was supplied into the chamber, the concentration of toluene was controlled to be 100 ppm, 500 ppm, 1000 ppm, and 2000 ppm. FIG. 12 shows the results. In FIG. 12, a vertical axis indicates a resistance value R with respect to a reference value $R_0$ ($\Delta R/R_0$ (%)) and a horizontal axis indicates an elapsed time.

From the results of FIG. 12, a change in positive resistance value was confirmed with the supply of toluene. Furthermore, when the concentration of toluene is higher, a change in resistance value increases. In addition, it was confirmed that the gas sensor of this example could be used as a sensor for evaluating the concentration of toluene. Moreover, after the supply of toluene was stopped after the start of supply thereof, it was confirmed that the resistance value of the gas sensor was recovered to the reference value $R_0$ and the gas sensor of this example could be used repeatedly.

REFERENCE SYMBOLS 10, 20 Gas sensor
11 Adsorbent
12, 24 Measurement unit
13, 25 Substrate
14, 26 Lead wire
21, 22 Electrode
23 Adsorption layer

What is claimed is:

1. A method of manufacturing a gas sensor, comprising:
    applying, on a substrate, a dispersion liquid containing a fibrous carbon nanohorn aggregate obtained by aggregating a plurality of single-walled carbon nanohorns in a fibrous form and a solvent; and
    forming an adsorbent containing the carbon nanohorn aggregate,
    wherein an amount of the fibrous carbon nanohorn aggregate in the dispersion liquid is 0.1 mg to 20 mg per 1 mL of the solvent.

2. The method of manufacturing a gas sensor according to claim 1, wherein the adsorbent has a thickness of 100 nm to 100 μm.

3. The method of manufacturing a gas sensor according to claim 2, wherein the absorbent has a thickness of 200 nm to 5 μm.

* * * * *